US012803968B2

(12) United States Patent
Bhat et al.

(10) Patent No.: US 12,803,968 B2
(45) Date of Patent: Nov. 17, 2026

(54) CUSTOM INFORMATION INJECTION FOR A SERVER WHILE ESTABLISHING END-TO-END SECURE COMMUNICATION WITH A CLIENT VIA TUNNELING SERVICE

(71) Applicant: Microsoft Technology Licensing, LLC, Redmond, WA (US)

(72) Inventors: Umesh Bhat, Jammu (IN); Manoj Kumar Ampalam, Suwanee, GA (US); Aditya Kanetkar, Bangalore (IN); Chandra Mouli Addaguduru, Bangalore (IN); Krupesh Satishkumar Dhruva, Hyderabad (IN); Jorge Jose Daboub Silhy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 18/530,777

(22) Filed: Dec. 6, 2023

(65) Prior Publication Data

US 2025/0193169 A1 Jun. 12, 2025

(51) Int. Cl.
*H04L 9/40* (2022.01)
*H04L 41/0631* (2022.01)
*H04L 67/2895* (2022.01)

(52) U.S. Cl.
CPC ...... *H04L 63/0823* (2013.01); *H04L 41/0631* (2013.01); *H04L 63/0435* (2013.01); *H04L 67/2895* (2013.01)

(58) Field of Classification Search
None
See application file for complete search history.

(56) References Cited

U.S. PATENT DOCUMENTS

2016/0029038 A1 1/2016 Zhao
2016/0088023 A1* 3/2016 Handa .................. G06F 16/972 709/219

(Continued)

OTHER PUBLICATIONS

Communication under Rule 71(3) Received in European Patent Application No. 21724479.7, mailed on Apr. 7, 2025, 07 pages.

(Continued)

*Primary Examiner* — Philip J Chea
*Assistant Examiner* — James Ross Hollister
(74) *Attorney, Agent, or Firm* — Ray Quinney & Nebeker P.C.; James Bullough

(57) ABSTRACT

System, methods, apparatuses, and computer program products are disclosed for injecting custom information for a server while establishing end-to-end secure communications with a client via a tunneling service. A reverse proxy receives, from a client over a first transport-layer connection, a request that includes an identifier associated with an on-premises resource. The reverse proxy determines, based on the identifier, that an error prevents forwarding of the client request to the on-premises resource. In response, the reverse proxy transmits, to an error handling service (EHS) over a second transport-layer connection, a new application-layer request comprising error handling information to enable the EHS to establish, via the reverse proxy, a secure communications channel with the client using the existing first transport-layer connection and the second transport-layer connection. The reverse proxy proxies, from the EHS and to the client, an encrypted response containing an error message.

20 Claims, 6 Drawing Sheets

(56) References Cited

U.S. PATENT DOCUMENTS

| | | | | |
|---|---|---|---|---|
| 2016/0173280 | A1* | 6/2016 | Tribble | G06F 21/60 713/153 |
| 2017/0093824 | A1* | 3/2017 | Shulman | H04L 63/1433 |
| 2018/0068008 | A1 | 3/2018 | Cruanes et al. | |
| 2019/0034520 | A1 | 1/2019 | Jalagam et al. | |
| 2019/0138639 | A1 | 5/2019 | Pal et al. | |
| 2020/0265098 | A1 | 8/2020 | Tepper et al. | |
| 2021/0349648 | A1 | 11/2021 | Fatemieh et al. | |
| 2021/0365407 | A1 | 11/2021 | Okutubo et al. | |
| 2022/0086215 | A1* | 3/2022 | Rowe | H04L 43/0864 |
| 2023/0412570 | A1* | 12/2023 | Holm | H04L 67/133 |
| 2023/0418784 | A1 | 12/2023 | Okutubo | |

OTHER PUBLICATIONS

International Search Report and Written Opinion mailed on Jul. 14, 2021, issued in PCT Application No. PCT/US2021/028270, 10 Pages.

Non-Final Office Action mailed on Mar. 16, 2023, in U.S. Appl. No. 18/058,331, 9 pages.

Notice of Allowance mailed on Jun. 14, 2023, in U.S. Appl. No. 18/058,331, 8 pages.

Notice of Allowance mailed on Sep. 21, 2022, in U.S. Appl. No. 16/881,379, 8 Pages.

Notice of Allowance mailed on Sep. 27, 2024, in U.S. Appl. No. 18/463,941, 9 pages.

Park., et al., "File Defragmentation Scheme for a Log-Structured File System," APSys '16: Proceedings of the 7th ACM SIGOPS Asia-Pacific Workshop on Systems, Aug. 2016, 7 Pages.

Decision to Grant a European Patent Pursuant to Article 97(1) EPC received for EP Application No. 21724479.7, mailed on Jul. 31, 2025, 2 pages.

Notice of Allowance mailed on Apr. 15, 2026, in U.S. Appl. No. 18/989,735, 9 pages.

* cited by examiner

CUSTOM INFORMATION INJECTION FOR A SERVER WHILE ESTABLISHING END-TO-END SECURE COMMUNICATION WITH A CLIENT VIA TUNNELING SERVICE

BACKGROUND

"Cloud computing" refers to the on-demand availability of computer system resources (e.g., applications, services, processors, storage devices, file systems, and databases) over the Internet and data stored in cloud storage. Servers hosting cloud-based resources may be referred to as "cloud-based servers" (or "cloud servers"). A "cloud computing service" refers to an administrative service (implemented in hardware that executes in software and/or firmware) that manages a set of cloud computing computer system resources.

Cloud computing platforms include quantities of cloud servers, cloud storage, and further cloud computing resources that are managed by a cloud computing service. Cloud computing platforms offer higher efficiency, greater flexibility, lower costs, and better performance for applications and services relative to "on-premises" servers and storage, which are physically hosted locally, such as in a facility of an organization. Accordingly, users are shifting away from locally maintaining applications, services, and data and migrating to cloud computing platforms.

Cloud relay services enable organizations to extend the reach of their on-premises services by allowing authorized users or applications to access on-premises resources securely through the cloud. The cloud relay services can manage incoming traffic, apply security measures such as firewalls or authentication mechanisms, and/or direct requests to the respective on-premises services, ensuring seamless and protected access while maintaining the integrity and security of the on-premises resources from the public Internet. Additionally, cloud relay services may enable end-to-end encryption of communications between clients and the on-premises resources, thereby mitigating risks associated with transmitting sensitive information across public networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

System, methods, apparatuses, and computer program products are disclosed for injecting custom information for a server while establishing end-to-end secure communications with a client via a tunneling service. A reverse proxy (of a tunneling service) receives, from a client over a first transport-layer connection, a request that includes a resource identifier associated with an on-premises resource. The reverse proxy determines, based at least on the resource identifier, that an error prevents forwarding of the client request to the on-premises resource. In response, the reverse proxy transmits, to an error handling service (EHS) over a new second transport-layer connection, a new application-layer request comprising error handling information. The error handling information enables the EHS to establish, via the reverse proxy, a secure communications channel with the client using the existing first transport-layer connection between the client and the reverse proxy and the existing second transport-layer connection between the reverse proxy and the EHS. The reverse proxy receives, from the EHS, an encrypted response comprising an error message generated based at least on the error handling information, and forwards the encrypted response to the client.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
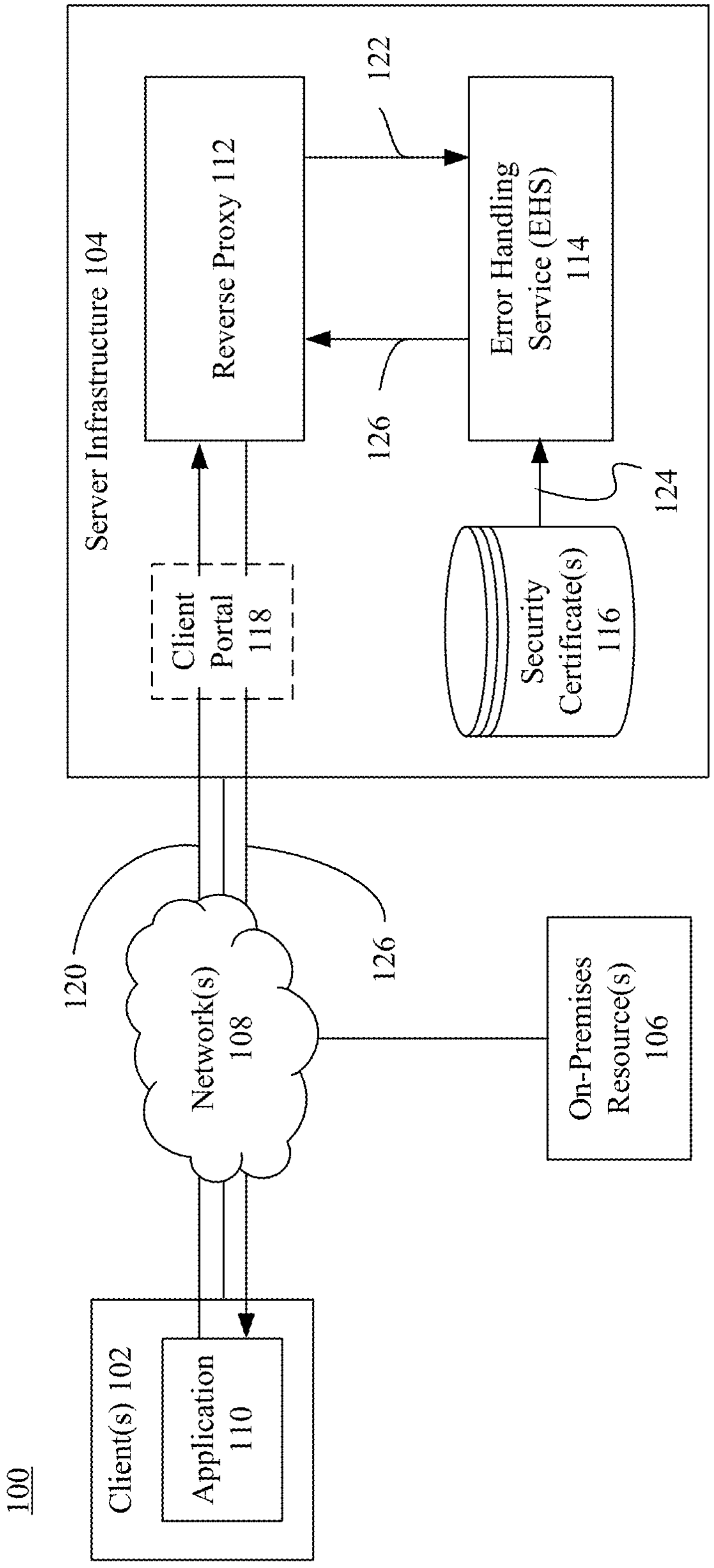
FIG. 1 shows a block diagram of an example system for injecting custom information for a server while establishing end-to-end secure communications with a client via a tunneling service, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As used herein, the term "on-premises resource" refers to hardware and/or software resources (such as, but not limited to, physical computing infrastructure, servers, networking equipment, databases, applications, services, and/or storage devices) that an organization owns, operates, and/or maintains within facilities and/or dedicated data centers that are directly controlled and/or managed by the organization.

II. Example Embodiments

Extending on-premises services to the cloud enables organizations to leverage the benefits of cloud computing while still maintaining a portion of the resources of the organization on-premise. This hybrid approach allows organizations to enjoy the scalability, flexibility, and cost-efficiency of cloud services while retaining control over sensitive or critical data housed within their physical premises. By integrating on-premises resources with cloud relay solutions, organizations can achieve a seamless and agile infrastructure, optimizing resources, and/or workloads based on fluctuating demands. Cloud relay services allow organizations to leverage cloud based tools to manage incoming traffic, apply security measures such as firewalls or authentication mechanisms, and/or direct requests to on-premises services, ensuring seamless and protected access while maintaining the integrity and security of the on-premises resources from the public Internet. Additionally, cloud relay services may enable end-to-end encryption of communications between clients and the on-premises resources, thereby mitigating risks associated with transmitting sensitive information across public networks.

Cloud relay services extend cloud management capabilities to on-premises infrastructure and/or multi-cloud environments, enabling organizations to centrally manage their resources across different environments. In embodiments, cloud relay services enable organizations to deploy cloud services, such as, but not limited to, cluster computing services, application services, and/or data services, to on-premises servers. This unified management approach allows organizations to leverage advanced capabilities of a cloud service provider for monitoring, security, and/or compliance across a different computing environment, enabling more efficient hybrid and/or multi-cloud operations.

Organizations are enabled to, in embodiments, extend on-premises services to the cloud through an onboarding process that connects and/or registers on-premises resources, such as, but not limited to, servers, computing clusters, applications, database servers, databases, and/or the like, with a cloud relay service of a cloud service provider. Onboarding enables these on-premises resources to be managed through a centralized interface of the cloud service provider, providing a unified view and consistent management experience across hybrid and/or multi-cloud environments. In embodiments, the onboarding process may include installing a cloud relay service agent on the target on-premises resources, enabling them to communicate securely with the cloud relay service, and then registering the target on-premises resources with cloud relay service. Once onboarded, the target on-premises resources become cloud relay-enabled, enabling organizations to apply cloud management capabilities, policies, and/or services to the target on-premises resources, regardless of their location, thus facilitating centralized control, compliance, and efficient management across diverse environments.

In embodiments, the cloud relay service agent installed on the target on-premises resources includes a listening agent that establishes a secure connection between the on-premises resources and the cloud relay service, and continually communicates with the cloud relay service. For example, the listening agent may provide information such as, but not limited to, telemetry data, configurations, metadata, and/or the like to the cloud relay service, enabling the target on-premises resources to be centrally monitored, controlled, and/or managed within the cloud environment, thereby extending cloud management capabilities to the target on-premises resources. In embodiments, the information provided by the listening agent may enable the cloud relay service to determine the availability of the on-premises resources. For instance, the cloud relay service may determine whether an on-premises resource is available (i.e., online, and reachable), and/or how many instances of the on-premises resource are available.

During the onboarding process, the cloud relay service, in embodiments, establishes a hybrid connection with the on-premises resource that acts as a conduit for communication between the cloud relay service and the on-premises resource. In embodiments, the hybrid connection may include properties associated with the on-premises resource, such as, but not limited to, a hostname, an Internet Protocol (IP) address, a port number, security information, and/or the like. The cloud relay service may, in embodiments, create, store, and/or maintain a mapping between a hostname and a corresponding on-premises resource to enable forwarding of incoming client requests to the on-premises resource. In embodiments, security information associated with the on-premises resource may include, but is not limited to, encryption protocols, encryption keys, security certificates, and/or the like to enable end-to-end secure communications between clients and on-premises resources.

The cloud relay service, in embodiments, provides the security information to the cloud relay service agent installed on the on-premises resource to enable the on-premises resource to decrypt communications from clients and/or to encrypt communications sent to clients. In embodiments, the cloud relay service agent may store the security information in secure location associated with the on-premises resource, including, but not limited to, as a Kubernetes secret. The cloud relay service may, in embodiments, also store the security information in a secure location associated with the cloud service provider to enable management of the on-premises resources by the cloud service provider. For instance, in embodiments, the cloud service provider may store the security information in a key vault associated with the on-premises resource.

When a reverse proxy of the cloud relay service receives a client request destined for an on-premises resource, the reverse proxy performs a lookup to map the client request to the on-premises resource. For instance, the reverse proxy may parse the client request to determine a resource identifier associated with the request and attempt to map the resource identifier to an on-premises resource. In embodiments, the resource identifier may include a static identifier, a temporary identifier, and/or a combination thereof. Upon successfully mapping the resource identifier to an on-premises resource, the reverse proxy determines the availability of the on-premises resource. For instance, based on management information maintained by the cloud service provider, the reverse proxy may determine whether an on-premises resource is available (i.e., online, and reachable), and/or how many instances of the on-premises resource are available.

When the on-premises resource is available, the reverse proxy establishes a tunnel forwards the client request to the cloud relay service agent running on the on-premises resource. In embodiments, the client request may be encrypted based on the security information generated during the onboarding process, and is decryptable by the cloud relay service agent using the security information generated during the onboarding process. The cloud relay service agent may, in embodiments, decrypt the client request and provide the cleartext request to the on-premises resource for processing. In embodiments, the on-premises resource may generate a response to the client request and provide the response to the cloud relay service agent for relaying to the client. For instance, the cloud relay service agent may receive the response from the on-premises resource, encrypt the response based on the security information generated during the onboarding process, and forward the encrypted response to the cloud relay service. Upon receiving the encrypted response, the reverse proxy may, in embodiments, forward the encrypted response to the client. In embodiments, communications between the client and the on-premises resource are encrypted end-to-end based on one or more security protocols, such as, but not limited to, Transport Layer Security (TLS), Secure Sockets Layer (SSL), and/or the like.

In embodiments, the reverse proxy of the cloud relay service may encounter, during handling of an incoming client request, an error, such as, but not limited to, the client request including an invalid resource identifier, the client request including an expired resource identifier, and/or the resource identifier in the client request mapping to an on-premises resource that is unavailable (e.g., offline and/or unreachable). Due to the design of the reverse proxy as a transport-layer device without access to required security certificates, the reverse proxy is unable to send a secure response over an application-layer protocol to the client. As such, when the reverse proxy encounters an error while handling a client request, the client typically receives a generic error message indicating that the connection has been terminated.

Embodiments disclosed herein are directed to graceful error handling by a reverse proxy of a cloud relay service by injecting custom information while establishing a secure communications channel with the client. In embodiments, the cloud relay service may include a high-privilege error handling service (EHS) in the cloud service provider environment that is capable establishing a secure communications channel with the client, and responding with an encrypted response that includes a detailed error message. When the reverse proxy encounters an error while handling a client request that is received over a first transport-layer connection, the reverse proxy may, in embodiments, provide error information to the EHS by injecting custom information into a new application-layer request, and providing the application request to the EHS over a new second transport-layer connection. Upon receiving the application-layer request, the EHS may, in embodiments, determine an on-premises resource associated with the client request, and generate a response containing an error message generated based on the error information in the application-layer request. In embodiments, the EHS may retrieve security information associated with the determined on-premises resource from a secure location in the cloud service provider environment, and establish, via the reverse proxy, a secure communications channel with the client using the existing first transport-layer connection between the client and the reverse proxy and the existing second transport-layer connection between the reverse proxy and the EHS. The EHS may then provide, to the reverse proxy, the response as an encrypted message over the secure communications channel that was established over the existing second transport-layer connection. The reverse proxy may then forward, to the client, the encrypted message over the secure communications channel that was established over the existing first transport-layer connection. The client device may, in embodiments, decrypt the encrypted message to obtain the error message in cleartext.

These and further embodiments are disclosed herein that enable the functionality described above and additional functionality. Such embodiments are described in further detail as follows.

For instance, FIG. 1 shows a block diagram of an example system 100 for injecting custom information for a server while establishing secure communications with a client via a tunneling service, in accordance with an embodiment. As shown in FIG. 1, system 100 includes one or more clients 102, a server infrastructure 104, and one or more on-premises resources 106. Client(s) 102, a server infrastructure 104, and one or more on-premises resources 106, which are communicatively coupled to each other via one or more networks 108. Furthermore, server infrastructure 104 includes a reverse proxy 112, an error handling service (EHS) 114, one or more security certificates 116, and, optionally, a client portal 118. System 100 is described in further detail as follows.

Client(s) 102 may comprise any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. As shown in FIG. 1, each of client(s) 102 includes an application 110 that can transmit to server infrastructure 104 one or more client requests 120 for an on-premises resource 106. Various example implementations of client(s) 102 are described below in reference to FIG. 6 (e.g., computing device 602, and/or components thereof).

In embodiments, application 110 may comprise various applications, such as, but not limited to, mobile applications, desktop applications, a web browser, and/or the like, configured to transmit client request(s) 120 to reverse proxy 112 via optional client portal 118. Various example implementations of application 110 are described below in reference to FIG. 6 (e.g., application 614, and/or components thereof).

Server infrastructure 104 may be a network-accessible server set (e.g., a cloud-based environment or platform). In an embodiment, the underlying resources of server infrastructure 104 may be co-located (e.g., housed in one or more nearby buildings with associated components such as backup power supplies, redundant data communications, environmental controls, etc.) to form a datacenter, may be distributed across different regions, and/or may be arranged in other manners. In accordance with an embodiment, server infrastructure 104 comprises part of the Microsoft® Azure® cloud computing platform, owned by Microsoft Corporation of Redmond, Washington, although this is only an example and not intended to be limiting. server(s) 108 may, in embodiments, be implemented, at least partially, on mobile device 102. Various example implementations of server infrastructure 104 are described below in reference to FIG. 6 (e.g., network-based server infrastructure 670, and/or components thereof).

On-premises resource(s) 106 may comprise a wide array of hardware and software that an organization owns, operates, and/or maintains within facilities and/or dedicated data centers it directly controls and/or manages, including, but not limited to, physical computing infrastructure, servers, computing clusters, applications, services, database servers, and/or data storage systems that an organization owns, operates, and maintains within its own facilities or dedicated data centers. Various example implementations of on-premises resource(s) 106 are described below in reference to FIG. 6 (e.g., on-premises servers 692, and/or components thereof).

Network(s) 108 may comprise one or more networks such as local area networks (LANs), wide area networks (WANs), enterprise networks, the Internet, etc., and may include one or more wired and/or wireless portions. In embodiments, network(s) 108 that connect client(s) 102 to server infrastructure 104 may be different from, the same as, or overlapping with network(s) 108 that connect server infrastructure 104 with on-premises resource(s) 106. Various example implementations of server infrastructure 104 are described below in reference to FIG. 6 (e.g., network 604, and/or components thereof).

Reverse proxy 112 is configured to extend on-premises resource(s) 106 to the cloud by forwarding client request(s) 120 received from client(s) 102 over first transport-layer connections of network(s) 108 to on-premises resource(s) 106. In embodiments, reverse proxy 112 may receive client request(s) 120 from client(s) 102 via optional client portal 118. In embodiments, reverse proxy 112 is configured to gracefully handle errors encountered with client request(s) 120 by providing error information in a new application-layer request 122 to EHS 114, and forward encrypted responses 126 received from EHS 114 over network(s) 108 to client(s) 102. In embodiments, reverse proxy 112 is configured to forward responses, if any, received from on-premises resource(s) 106 over network(s) 108 to client(s) 102.

In embodiments, reverse proxy 112 may include, but is not limited to, an application-layer Server Name Indication (SNI) proxy that facilitates the handling of multiple secure connections (e.g., Hypertext Transfer Protocol Secure (HTTPS), etc.) to different destinations using a single IP address. SNI is an extension of the TLS protocol that enables client(s) 102 to indicate the hostname of the desired destination server during the TLS handshake process. Reverse proxy 112 may, in embodiments, intercept incoming TLS connection requests (e.g., client request(s) 120), inspect the SNI field to determine the intended destination hostname (e.g., hostname associated with on-premises resource(s) 106, cloud resource (not depicted), etc.), and forward the connection request to the appropriate backend resource (e.g., on-premises resource(s) 106, cloud resource, etc.) based on the information in the SNI field. SNI enables hosting multiple websites, resources, and/or services with distinct SSL certificates on the same IP address, thereby optimizing resource utilization and enabling more efficient use of IP addresses in scenarios where traditional proxying methods might not allow for such differentiation based on hostnames within encrypted connections.

When reverse proxy 112 encounters an error while processing client request(s) 120, reverse proxy 112 is configured to inject custom error handling information into a new application-layer (e.g., HTTPS, Hypertext Transfer Protocol (HTTP), etc.) request 122, and transmit application-layer request 122 to EHS 114 over a new second transport-layer connection. In embodiments, reverse proxy 112 is configured to receive an encrypted response 126 containing an error message from EHS 114, and to forward the encrypted response 126 over network(s) 108 to client(s) 102. Reverse proxy 112, and components thereof, will be discussed in greater detail in conjunction with FIGS. 2 and 3 below.

EHS 114 is configured to receive, from reverse proxy 112 over the second transport-layer connection, application-layer request 122 containing custom error handling information, and to provide, to reverse proxy 112, an encrypted response 126 containing an error message for forwarding to client(s) 102. In embodiments, the custom error handling information may include, but is not limited to, a resource identifier (e.g., hostname, etc.) associated with on-premises resource(s) 106, a correlation identifier, a status code (e.g., HTTP/HTTPS status code, etc.), and/or an error message. EHS 114 is configured to retrieve, from security certificate(s) 116, security information 124 associated with the resource identifier, and establish, via reverse proxy 112, a secure communications channel with client(s) 102 using existing first transport-layer connections between client(s) 102 and reverse proxy 112 and existing second transport-layer connections between reverse proxy 112 and EHS 114. EHS 114 may then generate a response containing the error message, encrypt the response based on the retrieved security information, and transmit, to client(s) 102 via reverse proxy 112, the encrypted response over the secure communications channel as encrypted response 126. EHS 114, and components thereof, are discussed in greater detail in conjunction with FIGS. 2 and 3 below.

Security certificate(s) 116 is a service configured to store security information 124 associated with on-premises resource(s) 106 that enable cloud services of server infrastructure 104 to securely communicate with client(s) 102 on behalf of organization(s) associated with on-premises resource(s) 106. In embodiments, security certificate(s) 106 may include, but is/are not limited to, a secure and centralized cloud service (e.g., cloud key vault) designed for storing and/or managing sensitive information like keys, secrets, certificates, and/or encryption keys. In embodiments, security certificate(s) 116 is configured to provide security information 124 to EHS 114 based on a resource identifier received from EHS 114. In embodiments, access to security certificate(s) 116 may be limited to high-privileged services, such as, but not limited to, EHS 114.

Client portal 118 is a cloud interface configured to provide client(s) 102 access to cloud services and/or on-premises resource(s) 106. For instance, client portal 118 may, in embodiments, comprise a web portal that provides a webpage to enable application 110 running on client(s) 102 to display a user interface to a user of client(s) 102. In embodiments, user interactions with the user interface may cause client portal 118 to generate and/or provide client request(s) 120 to reverse proxy 112. Similarly, client portal 118 may receive encrypted response 126 from reverse proxy 112, provide encrypted response 126 as a webpage to application 110 running on client(s) 112. As used herein, the terms "client," "client(s)," "client 102," and/or "client(s) 102" may refer to client computing devices connected to server infrastructure 104 via network(s) 108, and/or client portal 118.

Figure 2:
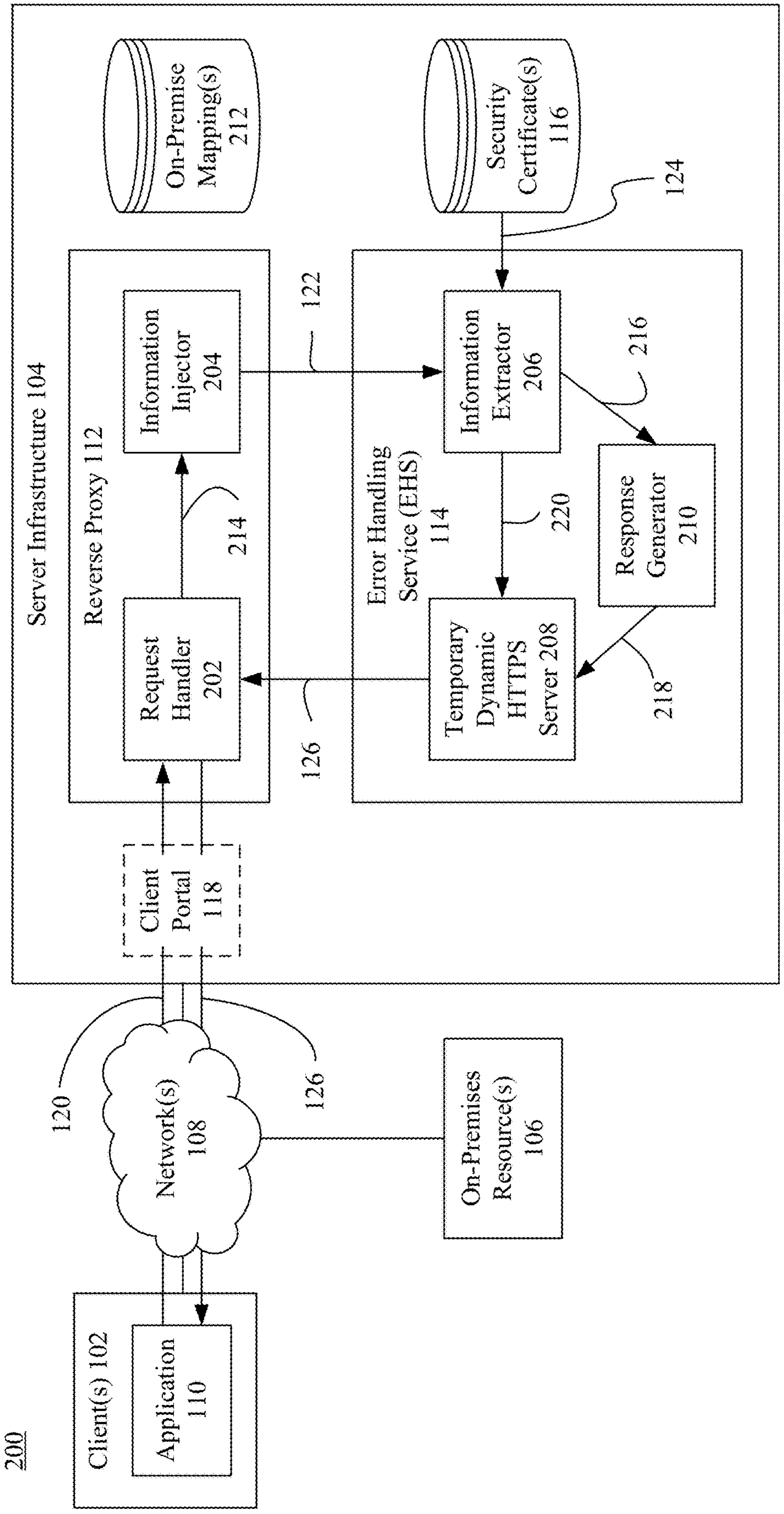
FIG. 2 depicts a block diagram of an example system for graceful error handling while establishing end-to-end secure communications with a client via a tunneling service, in accordance with an embodiment.

Embodiments described herein may operate in various ways to gracefully handle errors while establishing secure communications with a client via a tunneling service. For instance, FIG. 2 shows a block diagram of an example system 200 for graceful error handling while establishing secure communications with a client via a tunneling service, in accordance with an embodiment. As shown in FIG. 2, system 200 includes client(s) 102, server infrastructure 104, on-premises resource(s) 106, network(s) 108, application 110, reverse proxy 112, EHS 114, security certificate(s) 116, and client portal 118, as shown FIG. 1. In system 200, reverse proxy 112 includes a request handler 202 and an information injector 204, and EHS 114 includes an information extractor 206, a temporary dynamic HTTPS server 208, and a response generator 210. Furthermore, server infrastructure 104 additionally includes one or more on-premises mappings 212. System 200 is described in further detail as follows.

Request handler 202 is configured to receive client request(s) 120 from client(s) 102 and/or client portal 118, and process client request(s) 120. For instance, request handler 202 may determine an intended destination of client request(s) 120 based on a resource identifier (e.g., SNI field, hostname, etc.) in client request(s) 120, and forward client request(s) 120 to the appropriate backend resource (e.g., on-premises resource(s) 106, cloud resource, etc.). In embodiments, request handler 202 may validate the resource identifier in client request(s) 120 based on on-premises resource mapping(s) 212, including, but not limited to, determining whether the resource identifier is in a correct format, determining whether the resource identifier is expired, determining whether the resource identifier is spoofed, and/or the like. Furthermore, request handler 202 may, in embodiments, determine whether on-premises resource(s) 106 associated with the resource identifier are available (e.g., online and reachable).

When request handler 202 encounters an error while handling client request(s) 120, request handler 202 is configured to provide custom error handling information 214 to information injector 204 to enable information injector 204 to inject the custom error handling information into application-layer request 122. In embodiments, errors encountered by request handler 202 may include, but are not limited to, an invalid resource identifier, an expired resource identifier, a resource identifier in an incorrect resource identifier format, an intended on-premises resource associated with a valid and non-expired resource identifier is unavailable (e.g., offline and/or unreachable), and/or the like.

In embodiments, request handler 202 is further configured to proxy communications between EHS 114 and client(s) 102, and/or vice versa. For instance, request handler 202 may facilitate establishment of a secure communications channel between EHS 114 and client(s) 102 by receiving and forwarding handshake (e.g., TLS handshake, etc.) messages between EHS 114 and client(s) 102. Furthermore, request handler 202 may, in embodiments, proxy communications between EHS 114 and client(s) 102, and/or vice versa, after the establishment of a secure communications channel. For instance, request handler 202 may receive, from EHS 114, encrypted response 126, and forward encrypted response 126 over network(s) 108 to client(s) 102.

Information injector 204 is configured to receive custom error handling information 214 from request handler 202, inject custom error handling information 214 into application-layer request 122, and provide application-layer request 122 to EHS 114 over a new second transport-layer connection. In embodiments, custom error handling information 214 may include, but is not limited to, a resource identifier (e.g., hostname, etc.) associated with on-premises resource(s) 106, a correlation identifier, a status code (e.g., HTTP/HTTPS status code, etc.), and/or an error message. Information injector 204 may inject custom error handling information 214 into one or more elements of application-layer request 122, such as, but not limited to, a header of application-layer request 122 and/or components thereof, a body of application-layer request 122 and/or components thereof, and/or any combination thereof. In embodiments, application-layer request 122 may include, but is not limited to, an HTTP/HTTPS POST request, an HTTP/HTTPS GET request, an HTTP/HTTPS version 1.1 request, and/or any combination thereof.

Information extractor 206 is configured to receive application-layer request 122 from information reverse proxy 112 over the second transport-layer connection, and extract custom error handling information 214 therefrom. In embodiments, information extractor 206 may provide portions of the extracted custom error handling information 214 to temporary dynamic HTTPS server 208 and/or response generator 210. For instance, information extractor 206 may extract response information 216, such as, but not limited to, a correlation identifier, a status code, and/or an error message from the extracted custom error handling information 214 and provide response information 216 to response generator 210. In embodiments, information extractor 206 may extract a resource identifier from custom error handling information 214 and fetch, from security certificate(s) 116, security information 124 corresponding to the extracted resource identifier. Information extractor 206 may then provide, as connection information 220, portions of the extracted custom error handling information 214 and/or security information 124 to temporary dynamic HTTPS server 208.

Temporary dynamic HTTPS server 208 is configured to connection information 220 from information extractor 206, and establish, via reverse proxy 112, a secure communications channel with client(s) 102 using the existing second transport-layer connection and the existing first transport-layer connection. In embodiments, temporary dynamic HTTPS server 208 exchanges one or more handshake messages with client(s) 102 to establish the secure communications channel. Temporary dynamic HTTPS server 208 is configured to receive response 218 from response generator 210 and transmit response 218 over the established secure communications channel to client(s) 102 as encrypted response 126. In embodiments, the established secure communications channel may include, but is not limited to, an HTTPS connection.

Response generator 210 is configured to receive response information 216 from information extractor 206 and generate a response 218 based on response information 216. For instance, response generator 210 may generate a response 218 by including a status code and/or correlation identifier from response information 216 in one or more header fields of response 218, and/or by including an error message from response information 216 in a body of response 218. In embodiments, response generator 210 provides response 218 to temporary dynamic HTTPS server 208 for transmission, over the secure communications channel established using the existing second transport-layer connection, to client(s) 102 via reverse proxy 112.

On-premises mapping(s) 212 may include a service configured to information that map resource identifiers to on-premises resource(s) 106. In embodiments, on-premises mapping(s) 212 may include active mappings that map valid and non-expired resource identifiers to on-premises resource(s) 106, and/or expired mappings that map expired resource identifiers to on-premises resource(s) 106. Maintaining expired mappings may, in embodiments, enable request handler 202 to detect incoming requests with spoofed resource identifiers. For instance, a resource identifier for an on-premises resource may be deemed to be spoofed if it does not appear in on-premises mapping(s) 212 as either an active mapping or an expired mapping. In embodiments, on-premises mapping(s) 212 may be updated as existing resource identifiers expire, and/or new identifiers are generated.

Embodiments described herein may operate in various ways to facilitate communications between a client, reverse proxy, and an error handling service for graceful error handling while establishing secure communications with a client via a tunneling service. For instance, FIGS. 3A-3D depict communications flow diagrams 300, 310, 320, and 330, respectively, of communications between a client, reverse proxy, and an error handling service for graceful error handling while establishing secure communications with a client via a tunneling service, in accordance with an embodiment. As shown in FIGS. 3A-3D, communications flow diagrams 300, 310, 320, and 330 depict client(s) 102, reverse proxy 112, and EHS 114, as shown in FIGS. 1 and 2.

Figure 3A:
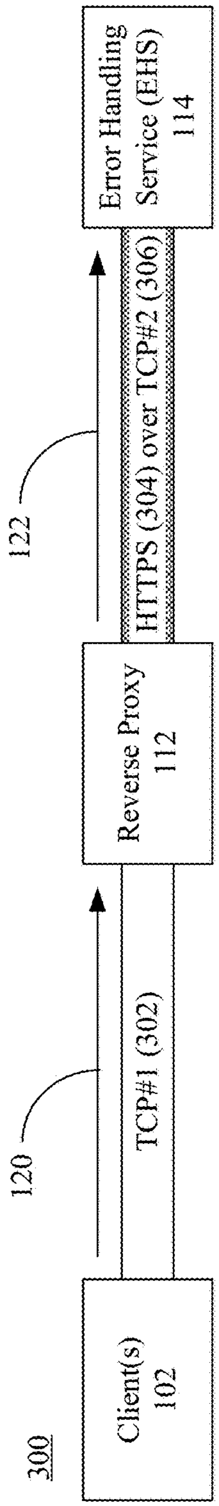
FIGS. 3A-3D depict flow diagrams of communications between a client, reverse proxy of a tunneling service, and an error handling service for graceful error handling while establishing end-to-end secure communications with a client via a tunneling service, in accordance with an embodiment.

In FIG. 3A, communications flow diagram 300 shows client(s) 102 transmitting client request(s) 120 to reverse proxy 112 over a first transmission control protocol (TCP) connection 302. Upon detecting an error in client request(s) 120, reverse proxy 112 establishes, with EHS 114, an HTTP/HTTPS connection 304 over a new second TCP connection 306, and transmits, to EHS 114, application-layer request 122 over HTTP/HTTPS connection 304.

Figure 3B:
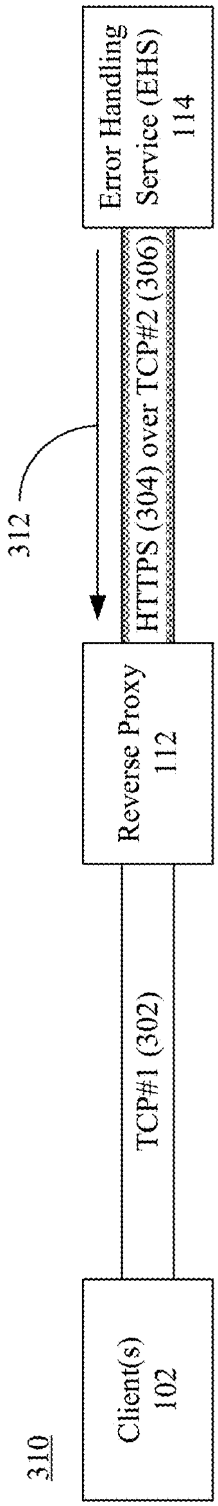

In FIG. 3B, communications flow diagram 310 shows EHS 114 transmitting an HTTP/HTTPS response 312 over HTTP/HTTPS connection 304 to reverse proxy 112. In embodiments, EHS 114 may process and/or validate application-layer request 122 and generate HTTP/HTTPS response 312 based on the validation. For instance, upon successful processing and/or validation of application-layer request 122, EHS 114 may transmit HTTP/HTTPS response 312 to reverse proxy 112 with a status of "200 OK." Alternatively, if application-layer request 122 is not successfully processed and/or validated, EHS 114 may transmit HTTP/HTTPS response 312 to reverse proxy 112 with a status of "400 Bad Request."

Figure 3C:
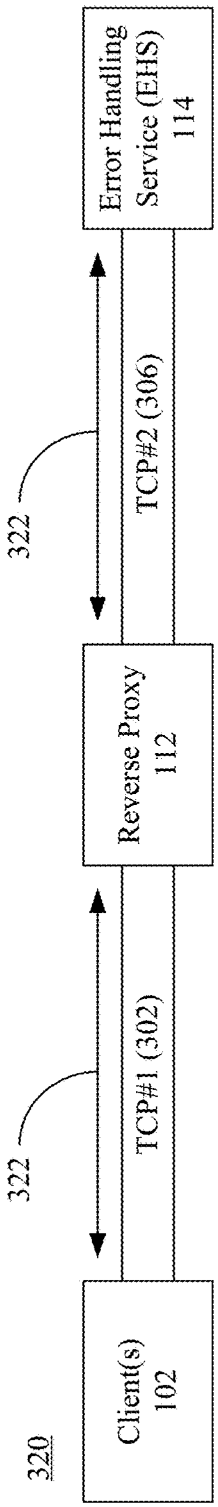

In FIG. 3C, communications flow diagram 320 shows reverse proxy 112 facilitating the establishment of a secure communications channel between EHS 114 and client(s) 102. In embodiments, EHS 114 appropriates second TCP connection 306, and transmits handshake messages 322 over second TCP connection 306 to reverse proxy 112, which then forwards handshake messages 322 to client(s) 102 over first TCP connection 302. Similarly, reverse proxy may receive handshake messages 322 from client(s) 102 over first TCP connection 302, and forward handshake messages 322 to EHS 114 over second TCP connection 306. In embodiments, handshake messages 322 may include, but are not limited to, client hello messages, server hello messages, server certificate messages, key exchange messages, authentication and key confirmation messages, finished messages, and/or error messages.

Figure 3D:
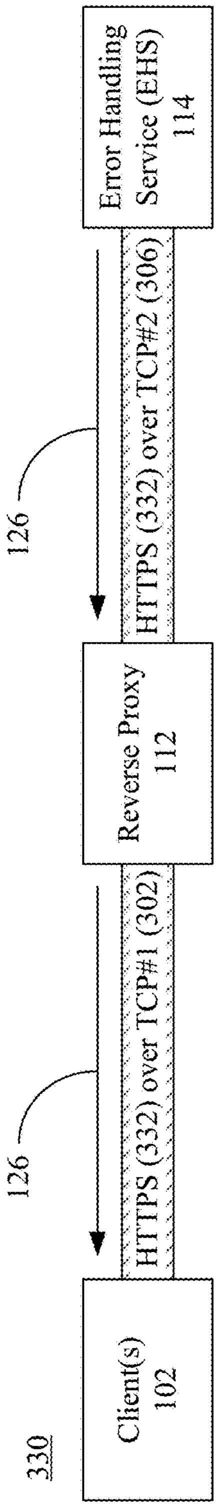

In FIG. 3D, communications flow diagram 330 shows an HTTPS connection 332 between EHS 114 and client(s) 102. In embodiments, HTTPS connection 332 is established between EHS 114 and client(s) 102 via reverse proxy 112 upon successful completion of a handshake exchange. In embodiments, HTTPS connection 322 is established as a tunnel across second TCP connection 306 and first TCP connection 302, where reverse proxy 112 proxies encrypted messages between client(s) 102 and EHS 114. For instance, in FIG. 3D, flow diagram 330 shows EHS 114 transmitting encrypted response 126 over HTTPS connection 332 to client(s) 102 via reverse proxy 112.

Figure 4:
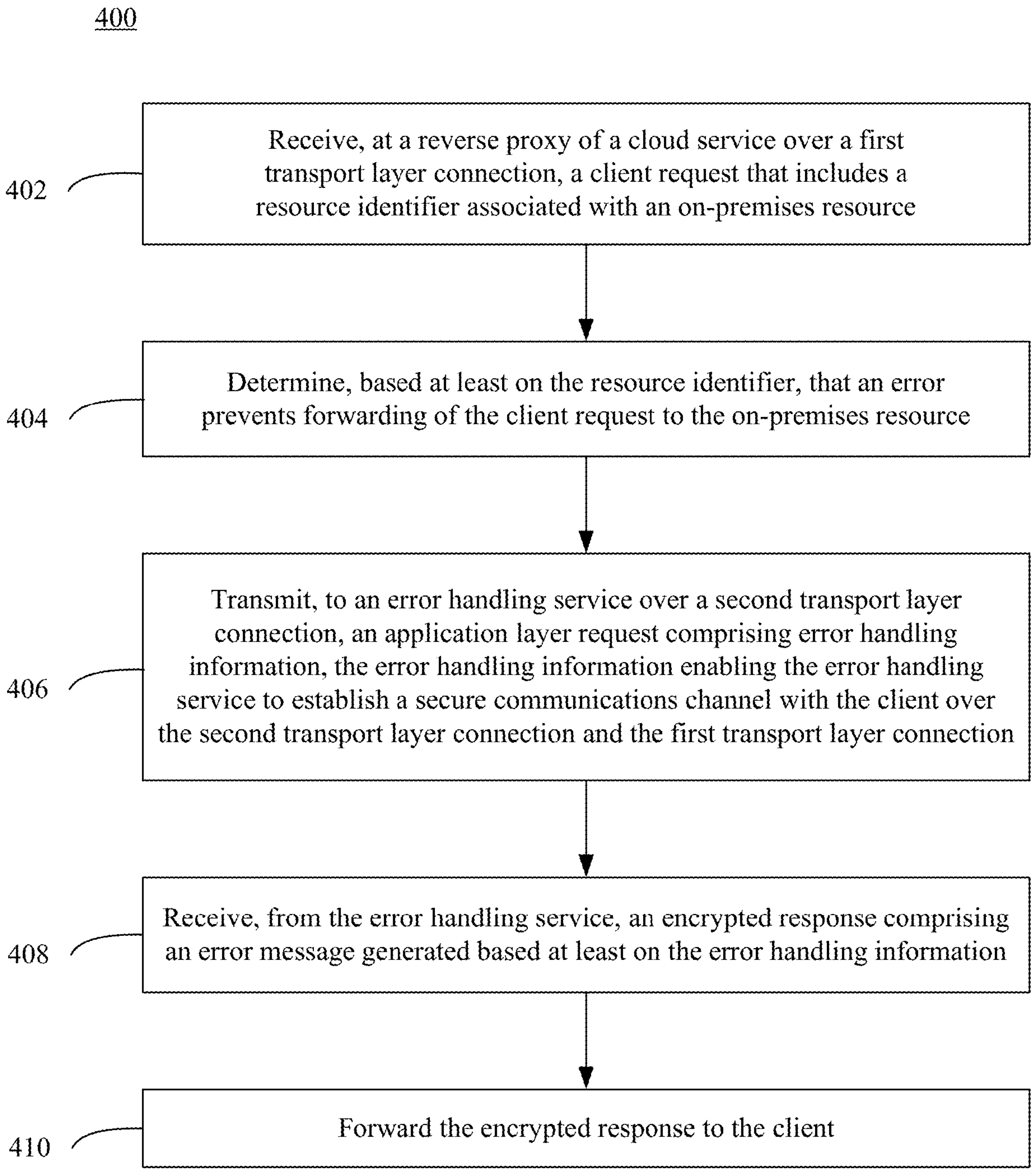
FIG. 4 depicts a flowchart of a process of a reverse proxy for injecting custom information for a server while establishing end-to-end secure communications with a client via a tunneling service, in accordance with an embodiment.

Embodiments described herein may operate in various ways to inject custom information for a server while establishing secure communications with a client via a tunneling service. For instance, FIG. 4 depicts a flowchart 400 of a process of a reverse proxy for injecting custom information for an error handling service while establishing secure communications with a client, in accordance with an embodiment. Server infrastructure 104, reverse proxy 112, request handler 202, and information injector 204 of FIGS. 1-3 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1-3 for illustrative purposes.

Flowchart 400 starts at step 402. In step 402, a client request is received over a first transport layer connection at a reverse proxy of a cloud service, the client request includes a resource identifier associated with an on-premises resource. For instance, request handler 202 of reverse proxy 112 may receive client request(s) 120 from client(s) 102 over first TCP connection 302. In embodiments, client request(s) 120 includes a resource identifier associated with on-premises resource(s) 106.

In step 404, an error that prevents forwarding of the client request to the on-premises resource is determined to have occurred based at least on the resource identifier. For instance, request handler 202 of reverse proxy 112 may determine, based on a resource identifier in client request(s) 120, that an error prevents forwarding of client request(s) 120. In embodiments, errors encountered by request handler 202 may include, but are not limited to, an invalid resource identifier, an expired resource identifier, a resource identifier in an incorrect resource identifier format, an intended on-premises resource associated with a valid and non-expired resource identifier is unavailable (e.g., offline and/or unreachable), and/or the like. In embodiments, request handler 202 may determine that a resource identifier is invalid and/or expired by performing a lookup of the resource identifier in on-premises mapping(s) 212. For instance, a resource identifier for an on-premises resource may be deemed to be expired if it appears in on-premises mapping(s) 212 as an expired mapping, and spoofed if it does not appear in on-premises mapping(s) 212 as either an active mapping or an expired mapping.

In step 406, an application-layer request comprising error handling information is transmitted to an error handling service over a second transport-layer connection, the error handling information enabling the error handling service to establish a secure communications channel with the client over the second transport-layer connection and the first transport-layer connection. For instance, information injector 204 may inject custom error handling information 214 into application-layer request 122, and transmit application-layer request 122 to EHS 114 over HTTP/HTTPS connection 304 that is established over second TCP connection 306. In embodiments, information injector 204 may inject custom error handling information 214 into one or more elements of application-layer request 122, such as, but not limited to, a header of application-layer request 122 and/or components thereof, a body of application-layer request 122 and/or components thereof, and/or any combination thereof. In embodiments, custom error handling information 214 may include, but is not limited to, a resource identifier (e.g., hostname, etc.) associated with on-premises resource(s) 106, a correlation identifier, a status code (e.g., HTTP/HTTPS status code, etc.), and/or an error message. In embodiments, error handling information 214 enables EHS 114 to establish, via reverse proxy 112, HTTPS connection 332 with client(s) 102 using second TCP connection 306 and first TCP connection 302.

In step 408, an encrypted response comprising an error message generated based at least on the error handling information is received from the error handling service. For instance, request handler 202 of reverse proxy 112 may receive, from EHS 114, encrypted response 126 over HTTPS connection 332 that is established over second TCP connection 306.

In step 410, the encrypted message is forwarded to the client. For instance, request handler 202 may forward encrypted response 126 to client(s) 102 over HTTPS connection 332 that is established over first TCP connection 302.

Figure 5:
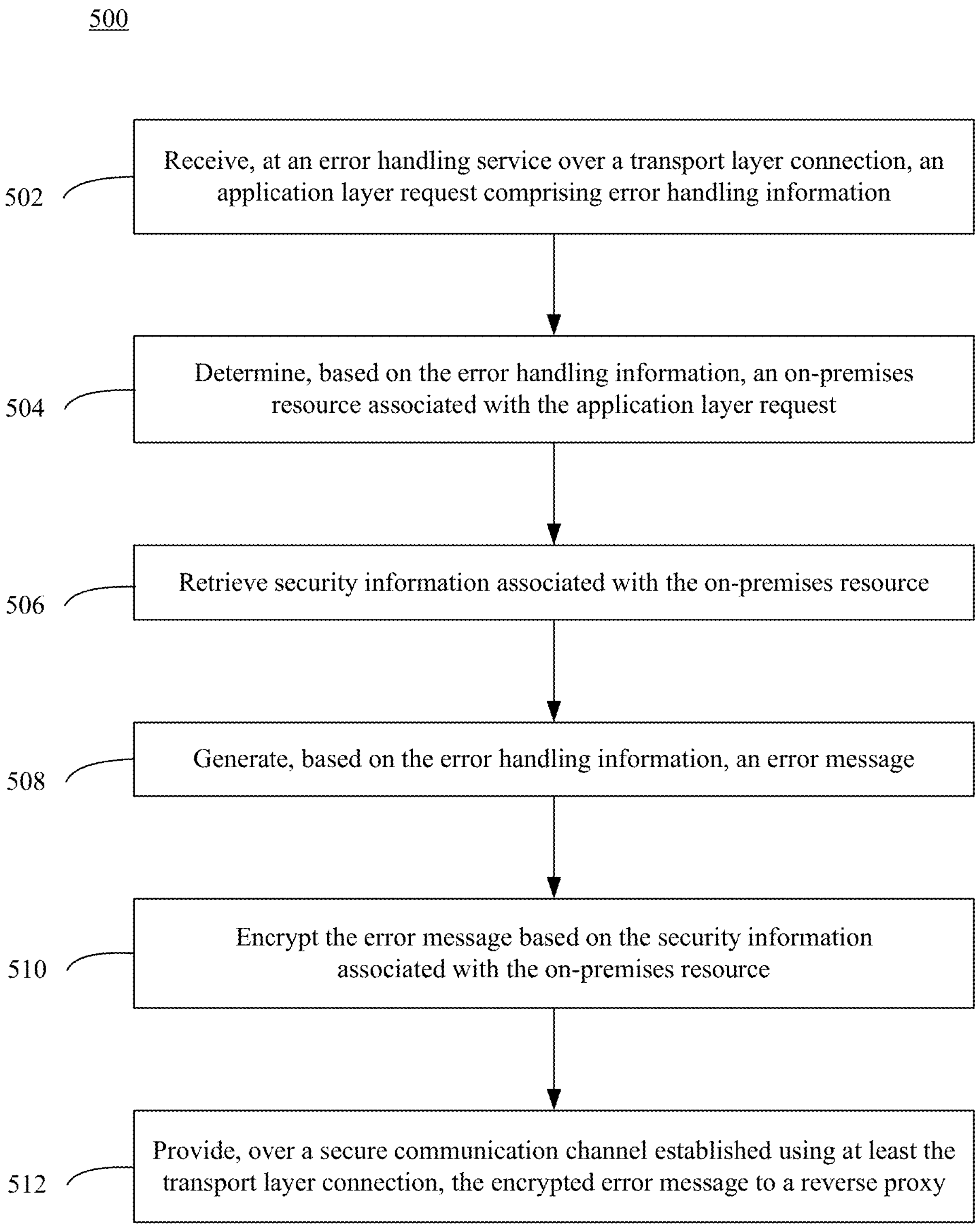
FIG. 5 depicts a flowchart of a process of an error handling service for graceful error handling while establishing end-to-end secure communications with a client via a tunneling service, in accordance with an embodiment.

Embodiments described herein may operate in various ways to gracefully handle errors while establishing secure communications with a client via a tunneling service. For instance, FIG. 5 depicts a flowchart 500 of a process of an error handling service for graceful error handling while establishing secure communications with a client via a tunneling service, in accordance with an embodiment. Server infrastructure 104, EHS 114, information extractor 206, temporary dynamic HTTPS server 208, and response generator 210 of FIGS. 1-3 may operate according to flowchart 500, for example. Note that not all steps of flowchart 500 may need to be performed in all embodiments, and in some embodiments, the steps of flowchart 500 may be performed in different orders than shown. Flowchart 500 is described as follows with respect to FIGS. 1-3 for illustrative purposes.

Flowchart 500 starts at step 502. In step 502, an application-layer request comprising error handling information is received at error handling service over a transport-layer connection. For instance, EHS 114 may receive, over TCP connection 306, application-layer request 122. In embodiments, application-layer request 122 includes custom error handling information 214, such as, but is not limited to, a resource identifier (e.g., hostname, etc.) associated with on-premises resource(s) 106, a correlation identifier, a status code (e.g., HTTP/HTTPS status code, etc.), and/or an error message.

In step 504, an on-premises resource associated with the application-layer request is determined based on the error handling information. For instance, information extractor 206 may extract a resource identifier from custom error handling information 214 received as part of application-layer request 122.

In step 506, security information associated with the on-premises resource is retrieved. For instance, information extractor 206 may retrieve, from security certificate(s) 116, security information 124 based on the resource identifier extracted from error handling information 214, and provide security information 124 to temporary dynamic HTTPS server 208 as part of connection information 220. Based on security information 124, temporary dynamic HTTPS server 208 may, in embodiments, establish HTTPS connection 332 with client(s) 102 over second TCP connection 306 and first TCP connection 302.

In step 508, an error message is generated based on the error handling information. For instance, response generator 210 may generate a response 218 based on response information 216. For instance, response generator 210 may generate response 218 by including a status code and/or correlation identifier from response information 216 in one or more header fields of response 218, and/or by including an error message from response information 216 in a body of response 218. In embodiments, response generator 210 provides response 218 to temporary dynamic HTTPS server 208 for transmission to client(s) 102 via reverse proxy 112.

In step 510, the error message is encrypted based on the security information. For instance, temporary dynamic HTTPS server 208 may receive response 218 from response generator 210, and encrypt response 218 using security information 124 to produce encrypted response 126.

In step 512, the encrypted error message is provided to a reverse proxy over a secure communications channel established using at least the second transport-layer connection. For instance, temporary dynamic HTTPS server 208 may provide encrypted response 126 to reverse proxy 112 over HTTPS connection 332 that is established over second TCP connection 306. In embodiments, reverse proxy 112 may forward encrypted response 126 to client(s) 102 over HTTPS connection 332 that is established over first TCP connection 302.

III. Example Mobile Device and Computer System Implementation

The systems and methods described above in reference to FIGS. 1-5, including client(s) 102, server infrastructure 104, on-premises resource(s) 106, network(s) 108, application 110, reverse proxy 112, EHS 114, security certificate(s) 116, client portal 118, request handler 202, information injector 204, information extractor 206, temporary dynamic HTTPS server 208, response generator 210, on-premises mapping(s) 212, and/or each of the components described therein, and/or communications flow diagrams 300, 310, 320, and/or 330, and/or the steps of flowcharts 400 and/or 500 may be implemented in hardware, or hardware combined with one or both of software and/or firmware. For example, client(s) 102, server infrastructure 104, on-premises resource(s) 106, network(s) 108, application 110, reverse proxy 112, EHS 114, security certificate(s) 116, client portal 118, request handler 202, information injector 204, information extractor 206, temporary dynamic HTTPS server 208, response generator 210, on-premises mapping(s) 212, and/or each of the components described therein, and/or communications flow diagrams 300, 310, 320, and/or 330, and/or the steps of flowcharts 400 and/or 500 may be each implemented as computer program code/instructions configured to be executed in one or more processors and stored in a computer readable storage medium. Alternatively, client(s) 102, server infrastructure 104, on-premises resource(s) 106, network(s) 108, application 110, reverse proxy 112, EHS 114, security certificate(s) 116, client portal 118, request handler 202, information injector 204, information extractor 206, temporary dynamic HTTPS server 208, response generator 210, on-premises mapping(s) 212, and/or each of the components described therein, and/or communications flow diagrams 300, 310, 320, and/or 330, and/or the steps of flowcharts 400 and/or 500 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 6:
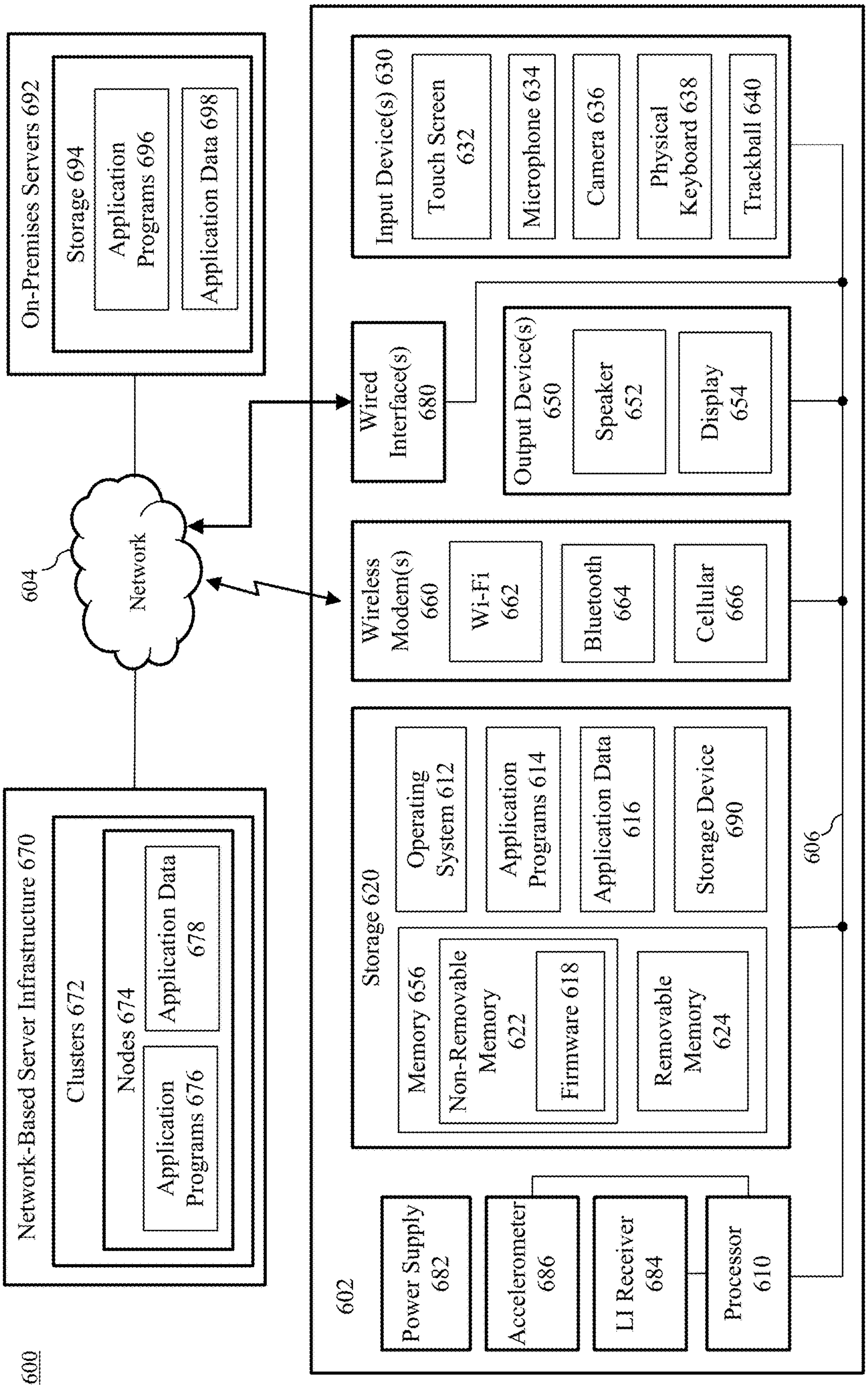
FIG. 6 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices, such as system 100 of FIG. 1, in which embodiments may be implemented are described as follows with respect to FIG. 6. FIG. 6 shows a block diagram of an exemplary computing environment 600 that includes a computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one client(s) 102, server infrastructure 104, on-premises resource (s) 106, network(s) 108, application 110, reverse proxy 112, EHS 114, security certificate(s) 116, client portal 118, request handler 202, information injector 204, information extractor 206, temporary dynamic HTTPS server 208, response generator 210, on-premises mapping(s) 212, and/or each of the components described therein, and/or communications flow diagrams 300, 310, 320, and/or 330, and/or the steps of flowcharts 400 and/or 500, described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi 662 modem (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc. or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

IV. Additional Example Embodiments

In an embodiment, a method for error handling while establishing end-to-end encrypted communications with a client, the method comprises: receiving, at a reverse proxy of a cloud service, a client request that includes a resource identifier associated with an on-premises resource; determining, based at least on the resource identifier, that an error prevents forwarding of the client request to the on-premises resource; transmitting, to an error handling service over a second transport-layer connection, an application layer request comprising error handling information, the error handling information enabling the error handling service to establish a secure communications channel with the client over the second transport layer connection and the first transport layer connection; receiving, from the error handling service, an encrypted response comprising an error message generated based at least on the error handling information; and forwarding, to the client, the encrypted response.

In an embodiment, the encrypted response is encrypted with security information associated with the on-premises resource.

In an embodiment, the security information comprises: a security certificate generated during onboarding of the on-premises resource, and stored at both a location accessible to the error handling service and at the on-premises resource.

In an embodiment, determining, based at least on the resource identifier, that an error prevents forwarding of the client request to the on-premises resource comprises at least one of: determining that the on-premises resource is unreachable; determining that the resource identifier has expired; or determining that the resource identifier is invalid.

In an embodiment, the application layer request comprising error handling information comprises: a Hypertext Transfer Protocol Secure (HTTPS) or a Hypertext Transfer Protocol (HTTP) message containing at least one of: a hostname of the on-premises resource, the error message, or a correlation identifier.

In an embodiment, the on-premises resource comprises: a computing cluster associated with a customer of the cloud service and connected to the cloud service via a hybrid connection.

In an embodiment, the method further comprises: retrieving, by the error handling service, security information associated with the on-premises resource; generating, by the error handling service, the error message based on the error handling information; and encrypting, by the error handling service, the error message using the security information associated with the on-premises resource.

In an embodiment, a system for error handling while establishing end-to-end encrypted communications with a client comprises: a processor; a memory device comprising program code structured to cause the processor to: receive, at a reverse proxy of a cloud service, a client request that includes a resource identifier associated with an on-premises resource; determine, based at least on the resource identifier, that an error prevents forwarding of the client request to the on-premises resource; transmit, to an error handling service over a second transport-layer connection, an application layer request comprising error handling information, the error handling information enabling the error handling service to establish a secure communications channel with the client over the second transport layer connection and the first transport layer connection; receive, from the error handling service, an encrypted response comprising an error message generated based at least on the error handling information; and forward, to the client, the encrypted response.

In an embodiment, the encrypted response is encrypted using security information associated with the on-premises resource.

In an embodiment, the security information comprises: a security certificate generated during onboarding of the on-premises resource, and stored at both a location accessible to the error handling service and at the on-premises resource.

In an embodiment, to determine, based at least on the resource identifier, that an error prevents forwarding of the client request to the on-premises resource, the program code is structured to cause the processor to perform at least one of: determine that the on-premises resource is unreachable; determine that resource identifier has expired; or determine that resource identifier is invalid.

In an embodiment, the application layer request comprises error handling information comprises: a Hypertext Transfer Protocol Secure (HTTPS) or a Hypertext Transfer Protocol (HTTP) message containing at least one of: a hostname of the on-premises resource, the error message, or a correlation identifier.

In an embodiment, the on-premises resource comprises: a computing cluster associated with a customer of the cloud service and connected to the cloud service via a hybrid connection.

In an embodiment, the program code is further structured to cause the processor to: retrieve security information associated with the on-premises resource; generate the error message based on the error handling information; and encrypt the error message using the security information associated with the on-premises resource.

In an embodiment, a computer-readable storage medium comprises computer-executable instructions for error handling while establishing end-to-end encrypted communications with a client, the computer-executable instructions, when executed by a processor, cause the processor to: receive, at a reverse proxy of a cloud service, a client request that includes a resource identifier associated with an on-premises resource; determine, based at least on the resource identifier, that an error prevents forwarding of the client request to the on-premises resource; transmit, to an error handling service over a second transport-layer connection, an application layer request comprising error handling information, the error handling information enabling the error handling service to establish a secure communications channel with the client over the second transport layer connection and the first transport layer connection; receive, from the error handling service, an encrypted response comprising an error message generated based at least on the error handling information; and forward, to the client, the encrypted response.

In an embodiment, the encrypted response is encrypted using security information associated with the on-premises resource.

In an embodiment, the security information comprises: a security certificate generated during onboarding of the on-premises resource, and stored at both a location accessible to the error handling service and at the on-premises resource.

In an embodiment, to determine, based at least on the resource identifier, that an error prevents forwarding of the client request to the on-premises resource, the instructions, when executed by the processor, cause the processor to perform at least one of: determine that the on-premises resource is unreachable; determine that the resource identifier has expired; or determine that the resource identifier is invalid.

In an embodiment, the application layer request comprising error handling information comprises: a Hypertext Transfer Protocol Secure (HTTPS) or a Hypertext Transfer Protocol (HTTP) message containing at least one of: a hostname of the on-premises resource, the error message, or a correlation identifier.

In an embodiment, the on-premises resource comprises: a computing cluster associated with a customer of the cloud service and connected to the cloud service via a hybrid connection.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for error handling while establishing end-to-end encrypted communications with a client, the method comprising:

receiving, at a reverse proxy of a cloud service over a first transport layer connection, a client request that includes a resource identifier associated with an on-premises resource, the reverse proxy lacking access to security information associated with the on-premises resource;

determining, based at least on the resource identifier, that an error prevents forwarding of the client request to the on-premises resource;

transmitting, to an error handling service over a second transport layer connection, an application layer request comprising error handling information, the error handling service configured to access the security information associated with the on-premises resource and establish a secure communications channel with the client over the second transport layer connection and the first transport layer connection;

receiving, from the error handling service, an encrypted response comprising an error message generated based at least on the error handling information, the encrypted response encrypted with security information associated with the on-premises resource; and forwarding, to the client, the encrypted response.

2. The method of claim 1, wherein the security information comprises:

a security certificate generated during onboarding of the on-premises resource, and stored at both a location accessible to the error handling service and at the on-premises resource.

3. The method of claim 1, wherein said determining, based at least on the resource identifier, that an error prevents forwarding of the client request to the on-premises resource comprises at least one of:

determining that the on-premises resource is unreachable;

determining that the resource identifier has expired; or determining that the resource identifier is invalid.

4. The method of claim 1, wherein the application layer request comprises error handling information comprises:

a Hypertext Transfer Protocol Secure (HTTPS) or a Hypertext Transfer Protocol (HTTP) message containing at least one of: a hostname of the on-premises resource, the error message, or a correlation identifier.

5. The method of claim 1, wherein the on-premises resource comprises:

a computing cluster associated with a customer of the cloud service and connected to the cloud service via a hybrid connection.

6. The method of claim 1, further comprising:

retrieving, by the error handling service, security information associated with the on-premises resource;

generating, by the error handling service, the error message based on the error handling information; and encrypting, by the error handling service, the error message using the security information associated with the on-premises resource.

7. The method of claim 1, further comprising:

injecting, by the reverse proxy, the error handling information into the application layer request.

8. A system for error handling while establishing end-to-end encrypted communications with a client, the system comprising:

a processor;

a memory device comprising program code structured to cause the processor to:

receive, at a reverse proxy of a cloud service over a first transport layer connection, a client request that includes a resource identifier associated with an on-premises resource, the reverse proxy lacking access to security information associated with the on-premises resource;

determine, based at least on the resource identifier, that an error prevents forwarding of the client request to the on-premises resource;

transmit, to an error handling service over a second transport layer connection, an application layer request comprising error handling information, the error handling service configured to access the security information associated with the on-premises resource and establish a secure communications channel with the client over the second transport layer connection and the first transport layer connection;

receive, from the error handling service, an encrypted response comprising an error message generated based at least on the error handling information, the encrypted response encrypted with security information associated with the on-premises resource; and forward, to the client, the encrypted response.

9. The system of claim 8, wherein the security information comprises:

a security certificate generated during onboarding of the on-premises resource, and stored at both a location accessible to the error handling service and at the on-premises resource.

10. The system of claim 8, wherein, to determine, based at least on the resource identifier, that an error prevents forwarding of the client request to the on-premises resource, the program code is structured to cause the processor to perform at least one of:

determine that the on-premises resource is unreachable;

determine that resource identifier has expired; or determine that resource identifier is invalid.

11. The system of claim 8, wherein the application layer request comprising error handling information comprises:

a Hypertext Transfer Protocol Secure (HTTPS) or a Hypertext Transfer Protocol (HTTP) message containing at least one of: a hostname of the on-premises resource, the error message, or a correlation identifier.

12. The system of claim 8, wherein the on-premises resource comprises:

a computing cluster associated with a customer of the cloud service and connected to the cloud service via a hybrid connection.

13. The system of claim 8, wherein the program code is further structured to cause the processor to:

retrieve security information associated with the on-premises resource;

generate the error message based on the error handling information; and encrypt the error message using the security information associated with the on-premises resource.

14. The system of claim 8, wherein the program code is further structured to cause the processor to:

inject, by the reverse proxy, the error handling information into the application layer request.

15. A computer-readable storage medium comprising computer-executable instructions for error handling while establishing end-to-end encrypted communications with a client, the computer-executable instructions, when executed by a processor, cause the processor to:

receive, at a reverse proxy of a cloud service, a client request that includes a resource identifier associated with an on-premises resource, the reverse proxy lacking access to security information associated with the on-premises resource;

determine, based at least on the resource identifier, that an error prevents forwarding of the client request to the on-premises resource;

transmit, to an error handling service over a second transport layer connection, an application layer request comprising error handling information, the error handling service configured to access the security information associated with the on-premises resource and establish a secure communications channel with the client over the second transport layer connection and the first transport layer connection;

receive, from the error handling service, an encrypted response comprising an error message generated based at least on the error handling information, the encrypted response encrypted with security information associated with the on-premises resource; and forward, to the client, the encrypted response.

16. The computer-readable storage medium of claim 15, wherein the security information comprises:

a security certificate generated during onboarding of the on-premises resource, and stored at both a location accessible to the error handling service and at the on-premises resource.

17. The computer-readable storage medium of claim 15, wherein, to determine, based at least on the resource identifier, that an error prevents forwarding of the client request to the on-premises resource, the instructions, when executed by the processor, cause the processor to perform at least one of:

determine that the on-premises resource is unreachable;

determine that the resource identifier has expired; or determine that the resource identifier is invalid.

18. The computer-readable storage medium of claim 15, wherein the application layer request comprising error handling information comprises:

a Hypertext Transfer Protocol Secure (HTTPS) or a Hypertext Transfer Protocol (HTTP) message containing at least one of: a hostname of the on-premises resource, the error message, or a correlation identifier.

19. The computer-readable storage medium of claim 15, wherein the on-premises resource comprises:

a computing cluster associated with a customer of the cloud service and connected to the cloud service via a hybrid connection.

20. The computer-readable storage medium of claim 15, wherein the computer-executable instructions, when executed by the processor, cause the processor to:

inject, by the reverse proxy, the error handling information into the application layer request.

* * * * *